Patented Apr. 8, 1930

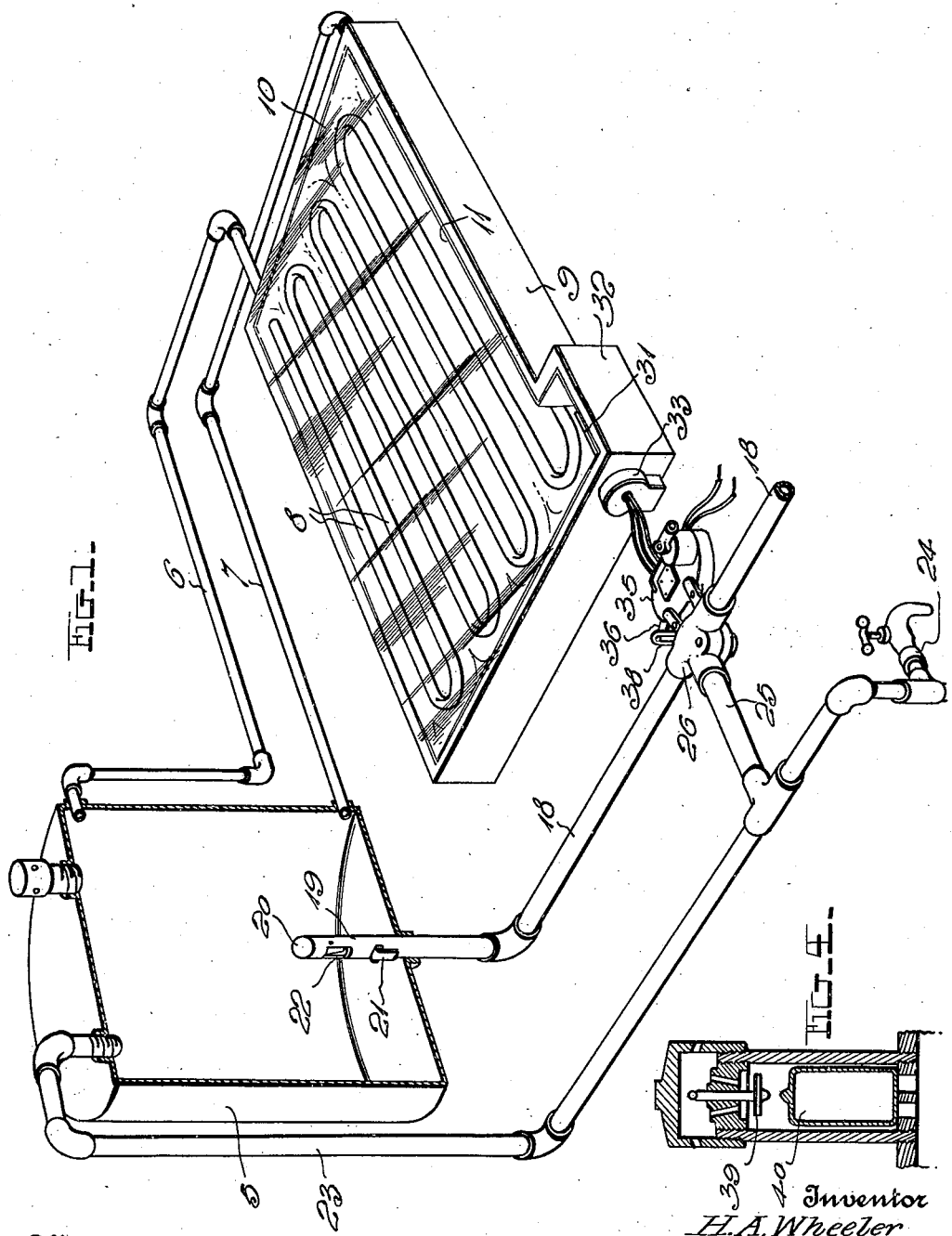

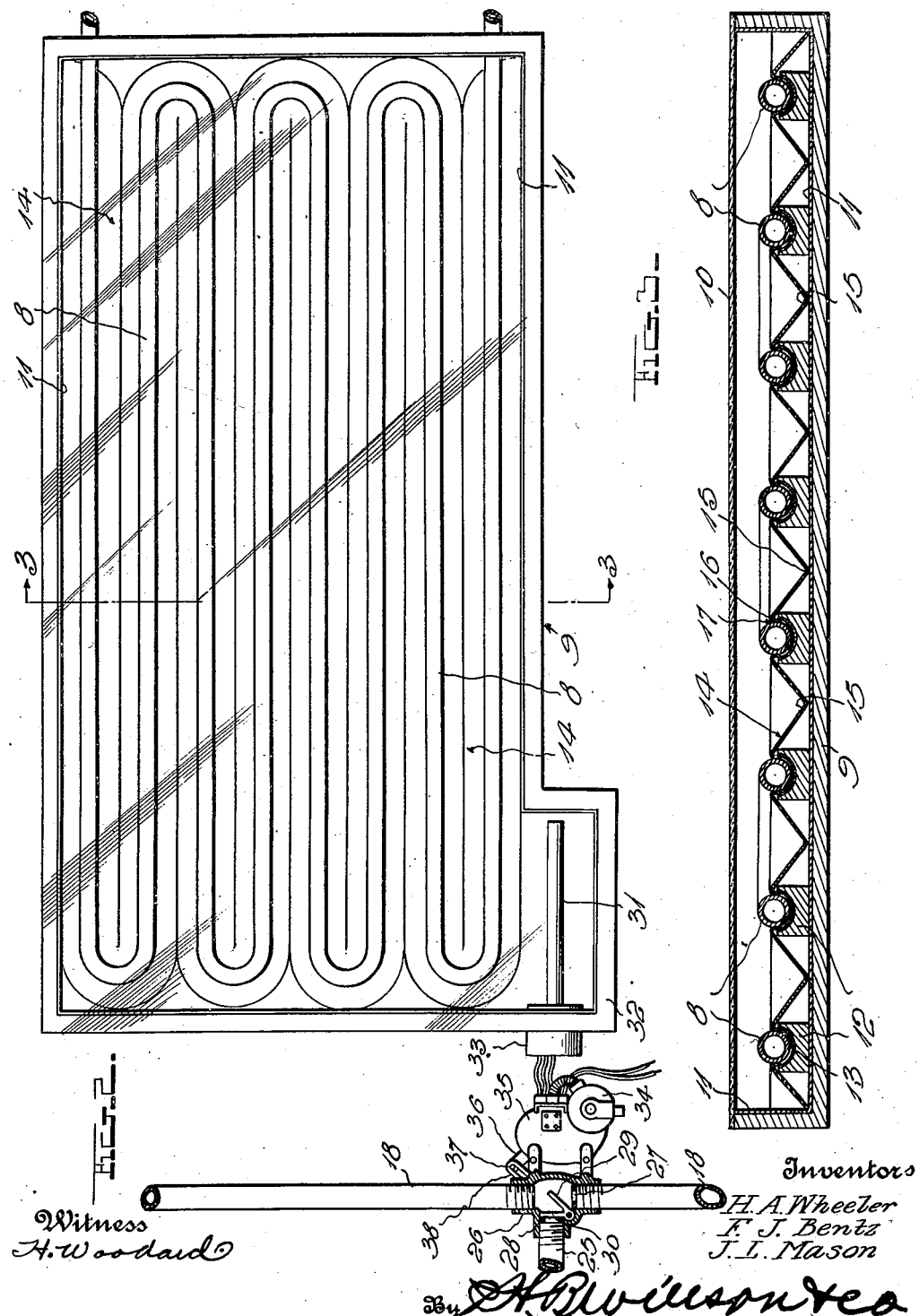

1,753,227

UNITED STATES PATENT OFFICE

HENRY A. WHEELER, FRANK J. BENTZ, AND JAMES L. MASON, OF MIAMI, FLORIDA, ASSIGNORS, BY DIRECT AND MESNE ASSIGNMENTS, OF THREE-FOURTHS TO SAID FRANK J. BENTZ AND ONE-FOURTH TO L. E. BENTZ

SOLAR WATER-HEATING SYSTEM

Application filed August 22, 1928. Serial No. 301,370.

In numerous localities in which the heat from the sun is sufficiently intense, solar water heaters are in quite extensive use. A well known heater of this character embodies a water tank and sun-heated means communicating with said tank for heating the water therein. The lower end of the tank is connected with a supply pipe for water under pressure and the upper end of the tank is provided with a hot water discharge pipe which extends to any desired point or points and is provided with one or more hot water discharge spigots. Opening of any spigot relieves the pressure in the tank and the water under pressure from the supply pipe consequently forces hot water from the upper end of said tank as the cold water enters. This type of system operates advantageously throughout the day as long as the rays of the sun are being effectively utilized. However, after sundown, the running of cold water into the tank each time hot water is withdrawn therefrom, gradually decreases the temperature of the water, with the result that there is none left for morning use. It is the primary object of our invention however to overcome this difficulty by providing a novel improvement, by the use of which no cold water is admitted to the tank after the apparatus reaches the end of its heating period, until the next morning, and whereby the hot water stored in the tank over night may be withdrawn in desired quantities by gravity. By thus preventing the entrance of cold water into the tank after the heating period is at an end, the hot water stored in the tank will remain sufficiently warm over night for morning use. Then, when the rays of the sun are again to be effectively utilized, the system is conditioned to function so that whenever hot water is withdrawn, cold water enters to take its place, and to be heated.

A further object of the invention is to provide automatic means controlled by a thermostat or analogous contrivance for conditioning the apparatus both for night use and day use.

With the foregoing in view, the invention resides in the novel subject matter hereinafter described and claimed, description being accomplished by reference to the accompanying drawings.

Fig. 1 is a perspective view partly in section.

Fig. 2 is a top plan view of the water heating means and associated parts.

Fig. 3 is an enlarged transverse sectional view on line 3—3 of Fig. 2.

Fig. 4 is a vertical sectional view through the air valve at the upper end of the water storage tank.

The general construction shown in the drawings is preferably followed and while such subject matter will be herein specifically described, it is to be understood that within the scope of the invention as claimed, variations may be made.

The numeral 5 denotes a hot water storage tank with which water circulating pipes 6 and 7 communicate, said pipes being connected to the ends of a heating coil which embodies parallel pipes 8. These pipes are within a shallow flat casing 9 having a glass top 10, the entire inner side of said casing, with the exception of its top, being provided with heat-insulating material 11. The pipes 8 are supported by longitudinally channeled wooden strips 12 or strips of other desired material, said pipes being disposed in the channels of said strips. Heat-insulating material 13 is preferably interposed between the pipes and strips to co-operate with the latter in preventing downward loss of heat from said pipes. A metal sheet 14 of any desired material to readily absorb heat and conduct it to the pipes 8, is provided throughout the area of the casing 9. This sheet is provided with alternate channels 15 and ridges 16, each of the latter being formed with a longitudinal slot 17. The pipes 8 are inset in these slots and may be soldered or otherwise secured to the sheet 14.

The construction described insures that maximum heating efficiency be obtained from the rays of the sun to heat the water in the tank 5.

A supply pipe 18 leads to the lower portion of the tank 5 for supplying cold water under pressure to the latter as hot water is withdrawn. For purposes to appear, this pipe 18 terminates in an upstanding portion 19 in the lower end of the tank 5, the upper extremity of this portion 19 being closed as at 20. Pipe portion 19 is provided with an outwardly opening check valve 21 near the bottom of the tank 5 and with an inwardly opening check valve 22 positioned above said valve 21. These parts also function as hereinafter explained.

Leading from the upper end of the tank 5, is a hot water discharge pipe 23 leading to one or more spigots 24. Upon opening of one of the spigots, pressure in the tank 5 is relieved, with the result that cold water enters through the pipe 18 and the check valve 21, driving hot water from the top of the tank out through the discharge pipe 23. The hot water is discharged in this way and replaced by cold water as long as the rays of the sun can be effectively utilized for heating the water in the tank. However, provision is made whereby no cold water can enter the tank after sundown and whereby the hot water which is stored within such tank may be drawn from it by gravity. These ends can be obtained in various ways but the subject matter shown will suffice for illustrative purposes.

A branch pipe 25 is connected with the hot water discharge pipe 23, preferably near the tank 5. This branch pipe communicates also with a valve casing 26 with which the supply pipe 18 is provided. In the casing 26, two valve seats 27 and 28 have been shown, one for the supply pipe 18 and one for the branch 25. A movable valve member is pivotally mounted in the casing 26 and embodies a valve portion 29 co-operable with the seat 27 and another valve portion 30 co-operable with the seat 28, these portions being so related that when one is needed, the other is open.

When the dual valve above described is in the position shown in Fig. 2, the apparatus is in condition for day use, the branch 25 being then cut off from the pipe 18 and free passage of water being permitted through the latter to the tank 5. This cold water enters the tank at the lower extremity of the latter through the check valve 22. However, when the valve is moved to its opposite position, it closes the seat 27 and places the branch 25 is communication with the portion of the pipe 18 between the valve and the tank 5. Thus, upon opening of the spigot 24, hot water from the tank will enter the pipe 18 through the check valve 22, will travel through a portion of this pipe to the valve casing 26, and through this casing and the branch 25, will travel to the hot water discharge pipe 23 through which it is conducted to the open spigot. Thus, hot water is drawn from the tank and no cold water is admitted, flow of the latter being prevented due to closing of the valve 29 against the seat 27.

Automatic means are provided for operating the dual valve above described, said means preferably embodying a thermostat 31 controlled by the sun heat rather than the water heat, together with operating connections between this thermostat and the valve. In the present showing, the thermostat 31 is within an offset portion 32 of the casing 9, and said thermostat controls an electric switch 33 which in turn controls an electric motor 34. This motor is connected by a train of gearing within the housing 35, with an arm 36, and this arm has an appropriate connection 37 with an arm 38 secured to the valve 29—30. At the end of the day, when the sun heat is sufficiently diminished, the thermostat 31, switch 33, motor 34, etc. operate to move the valve to its other position from that shown in Fig. 2, permitting drawing off of hot water from the tank 5 by gravity. In the morning however, when the sun heat again raises the temperature of the thermostat, it and associated parts again effect positioning of the valve as seen in Fig. 2, with the result that each time hot water is withdrawn, cold water enters to take its place.

Naturally, the water at the lower end of the tank 5 is always at a lower temperature than that at the upper end thereof. Hence, the pipe portion 19 and the check valve 22 are provided to prevent drawing of the relatively cold water from the lower end of the tank when the system is operating by gravity.

When the tank 5 is being filled with water under pressure entering through the check valve 21, it is essential that air be exhausted from the upper end of said tank. Similarly, when water is being drawn from the tank by gravity, it is necessary that air be admitted to the upper end of the tank. To accomplish these ends, an air valve is provided in the top of the tank or at other desired location. This valve may be of the detailed construction shown in Fig. 4 or of other desired form. In the view under consideration, the movable valve member 39 is closed by a float 40 when the water in the tank rises sufficiently, but as the water level recedes, the float drops and the valve is self-opening as shown in the drawing.

By the use of our improvements, we save approximately 50% of the hot water which is being wasted at present with solar heating systems of the type to which we have above referred. Not only do we save in hot water by the use of the system, but with a smaller and less expensive tank and water-heating means, we are enabled to deliver a larger quantity of hot water. Ordinarily, an eight-hundred gallon tank with six heating coils will only deliver about four-hundred gallons of hot water per day, whereas with the same size tank, we can deliver at least eight-hundred gallons of water in the same period. In addition to operating the system in the usual way throughout the day and delivering hot water whenever desired, we hold over a large quantity for use on the following morning, which cannot be accomplished with the present day systems.

Attention is again invited to the fact that within the scope of the invention, numerous variations may be made, the present disclosure being primarily for illustrative purposes.

We claim:—

1. In a water heating system, a closed hot water storage tank, a supply pipe leading to said tank for supplying water thereto under pressure while hot water is being discharged, a discharge pipe from the upper end of the tank through which hot water may be discharged, means for preventing flow of water to the tank through said supply pipe, conducting means for permitting discharge of hot water from the tank by gravity when said flow-preventing means is closed, and a valve for then admitting air to the tank and for later venting said tank while refilling.

2. In a water heating system, a closed hot water storage tank, a supply pipe leading to the lower end of said tank for supplying cold water thereto under pressure while hot water is being discharged, a discharge pipe from the upper end of the tank through which hot water may be discharged, means for preventing flow of cold water to the tank through said supply pipe and for effecting communication between said discharge pipe and the portion of the supply pipe between the flow-preventing means and the tank when said flow-preventing means is closed, permitting discharge of hot water from the tank by gravity, and a valve for then admitting air to the tank and for later venting said tank while refilling.

3. In a water heating system, a closed hot water storage tank, a supply pipe leading to the lower end of said tank for supplying cold water thereto under pressure while hot water is being discharged, a discharge pipe from the upper end of the tank through which hot water may be discharged, a dual valve for preventing flow of cold water through said supply pipe to the tank and for then placing said discharge pipe in communication with the portion of the supply pipe between the flow-preventing means and the tank, permitting discharge of hot water from the tank by gravity, and a valve for then admitting air to the tank and for later venting said tank while refilling.

4. In a water heating system, a closed hot water storage tank, a supply pipe leading to the lower end of said tank for supplying cold water thereto under pressure while hot water is being discharged, a discharge pipe from the upper end of the tank through which hot water may be discharged, means for preventing flow of cold water to the tank through said supply pipe, conducting means for permitting discharge of hot water from the tank by gravity when said flow-preventing means is closed, a valve for then admitting air to the tank and for later venting said tank while refilling, sun-heated means for heating the water in said tank, and heat-receiving operating means for automatically closing said flow-preventing means upon predetermined decrease in the heat imparted to said operating means.

5. In a water heating system, a closed hot water storage tank, a supply pipe leading to the lower end of said tank for supplying cold water thereto under pressure while hot water is being discharged, a discharge pipe from the upper end of the tank through which hot water may be discharged, means for preventing flow of cold water to the tank through said supply pipe and for effecting communication between said discharge pipe and the portion of the supply pipe between the flow-preventing means and the tank when said flow-preventing means is closed, permitting discharge of hot water from the tank by gravity, a valve for then admitting air to the tank and for later venting said tank while refilling, sun-heated means for heating the water in said tank, and heat-receiving operating means for automatically bringing said flow-preventing and communication-effecting means into play upon predetermined decrease in the heat imparted to said operating means.

6. In a water heating system, a closed hot water storage tank, a supply pipe leading to the lower end of said tank for supplying cold water thereto under pressure while hot water is being discharged, a discharge pipe from the upper end of the tank through which hot water may be discharged, a dual valve for preventing flow of cold water through said supply pipe to the tank and for then placing said discharge pipe in communication with the portion of the supply pipe between the flow-preventing means and the tank, permitting discharge of hot water from the tank by gravity, a valve for then admitting air to the tank and for later venting said tank while refilling, sun-heated means for heating the water in said tank, and heat-receiving operating means for automatically operating said dual valve upon predetermined decrease in the heat imparted to said operating means.

7. In a solar water heating means, a tank, sun-heated means for heating the water in said tank, means for supplying water to the tank as hot water is discharged therefrom, and heat-controlled means for automatically stopping flow of water to said tank upon predetermined decrease in the heat imparted to said heat-controlled means.

8. A structure as specified in claim 2; said cold water supply pipe terminating in an upstanding portion disposed in the tank, said pipe portion having an outwardly opening check valve near the tank bottom and an inwardly opening check valve spaced above the first named check valve, said pipe portion being otherwise out of communication with the tank.

9. In a solar water heater having a water-receiving tank and sun-heated water-heating means, thermostatic means for automatically stopping flow of water to said tank upon predetermined decrease in the heat imparted to said thermostatic means.

In testimony whereof we have hereunto affixed our signatures.

HENRY A. WHEELER.
FRANK J. BENTZ.
JAMES L. MASON.